United States Patent
Vellmer et al.

[11] Patent Number: 5,484,974
[45] Date of Patent: Jan. 16, 1996

[54] MAKING ELECTRIC-RESISTANCE-SOLDERED MULTILAYER TUBING

[75] Inventors: Carl H. Vellmer, Sundern; Udo Mänken, Wuppertal, both of Germany

[73] Assignee: Carl Froh Rohrenwerk GmbH & Co., Sundern, Germany

[21] Appl. No.: 315,215

[22] Filed: Sep. 28, 1994

[30] Foreign Application Priority Data

Sep. 30, 1993 [DE] Germany ............ 43 33 036.3

[51] Int. Cl.$^6$ .............. B23K 1/00; B23K 1/14; B23K 1/16
[52] U.S. Cl. .................. 219/85.22; 219/85.1
[58] Field of Search ............... 219/85.22, 85.1, 219/85.13, 116

[56] References Cited

U.S. PATENT DOCUMENTS

| | | | |
|---|---|---|---|
| 1,861,421 | 5/1932 | Cibs | 219/85.22 |
| 1,892,608 | 12/1932 | Bundy | 219/85.22 |
| 2,084,268 | 6/1937 | Quarnstrom | 219/85.22 |
| 2,092,018 | 9/1937 | Quarnstrom | 219/85.22 |
| 3,636,298 | 1/1972 | Risberg et al. | 219/116 |
| 4,169,975 | 10/1979 | Block | 219/116 |
| 4,379,216 | 4/1983 | Weiss | 219/85.15 |
| 4,803,331 | 2/1989 | Cohen | 219/110 |
| 4,822,969 | 4/1989 | Yao | 219/50 |

FOREIGN PATENT DOCUMENTS

| | | |
|---|---|---|
| 0036968 | 10/1981 | European Pat. Off. . |
| 886945 | 10/1953 | Germany . |
| 2425349 | 12/1975 | Germany . |
| 2517248 | 10/1978 | Germany . |
| 2828960 | 1/1980 | Germany . |

OTHER PUBLICATIONS

*Konduktive Erwärmung von Metallen* 1989; Rheinisch–Westfällisches Elektrizitätswerk AG; Essen, Germany, pp. 15ff.

Primary Examiner—Marvin M. Lateef
Assistant Examiner—J. Pelham
Attorney, Agent, or Firm—Herbert Dubno; Andrew Wilford

[57] ABSTRACT

Tubing is made by advancing a flat metal strip in a travel direction along a path through a forming station and then through a soldering station and then through a cooling station. The strip is shaped in the forming station into a multilayer tubular shape by pressing it against a mandrel with a pair of forming rollers. Downstream the strip is engaged in the soldering station by a pair of contact rollers and electrical current is applied to the forming and contact rollers to flow via the forming and contact rollers through the tubular strip between the forming and contact rollers to heat the strip in the soldering station and thereby fuse layers of the tubular strip together. The forming rollers are rotated at a peripheral speed identical to a travel speed of the strip so that they do not slip on the strip, while the contact rollers are driven at a peripheral speed greater than that of the forming rollers. The soldered tubular strip is then cooled in the cooling station.

16 Claims, 4 Drawing Sheets

MAKING ELECTRIC-RESISTANCE-SOLDERED MULTILAYER TUBING

FIELD OF THE INVENTION

The present invention relates to the manufacture of tubing. More particularly this invention concerns a method of and apparatus for making electric-resistance-soldered multilayer tubing.

BACKGROUND OF THE INVENTION

U.S. Pat. No. 4,379,216 describes a method of making multilayer electrical-resistance-soldered tubing by first forming a flat copper-clad steel strip into a U-shape, then pressing this U-shaped workpiece into a tubular shape by engaging it with grooved rollers against a mandrel held stationarily inside the strip which is advanced downstream. Then an electrical current is applied to the strip by engaging it immediately downstream of the forming rollers with a contact shoe connected to one side of an alternating-current source and somewhat downstream therefrom by a pair of idler rollers connected to the other side of the source. The heating is adjusted by moving the contact shoe longitudinally along the workpiece, increasing or decreasing the resistance of the path through which the current flows. The voltage flowing in the workpiece heats it sufficiently to fuse the copper. The hot workpiece then passes through a cooling chamber where the copper resolidifies, soldering together the multilayer tube. The result is a tube of excellent strength with virtually no possibility of leakage due to the surface bonding of the several layers.

German patent 886,945 of B. Quarnström of 5 Oct. 1953 describes another such system which uses three sets of rollers to form a heating zone. The middle set of rollers is connected to one side of a single-phase alternating-current source, like that of the Weiss reference, and the two flanking roller sets are connected to the other side of the source.

German patent 2,828,960 of H. Dietzel describes a similar such system using single-phase alternating current in addition to inductive heating. In *Konduktive Erwärmung von Metallen* (1989; Rheinisch-Westfälisches Electrizitätitswerk AG; Essen, Germany; pp. 15ff) the uses of alternating and direct current in such heating applications are discussed. This system is only applicable to wires or workpieces of solid cross section, not to tubes.

Such systems can produce good-quality pipe, but in general the ease of control and the throughput could be improved.

OBJECTS OF THE INVENTION

It is therefore an object of the present invention to provide an improved method of and apparatus for making multilayer electric-resistance-soldered tubing.

Another object is the provision of such an improved method of and apparatus for making multilayer electric-resistance-soldered tubing which overcomes the above-given disadvantages, that is which is easy to control and which can produce tubing at a greater rate than the prior-art systems.

SUMMARY OF THE INVENTION

Tubing is made according to the invention by advancing a flat metal strip in a travel direction along a path through a forming station and then through a soldering station and then through a cooling station. The strip is shaped in the forming station into a multilayer tubular shape by pressing it against a mandrel with a pair of forming rollers. Downstream the strip is engaged in the soldering station by a pair of contact rollers and electrical current is applied to the forming and contact rollers to flow via the forming and contact rollers through the tubular strip between the forming and contact rollers to heat the strip in the soldering station and thereby fuse layers of the tubular strip together. The forming rollers are rotated at a peripheral speed identical to a travel speed of the strip so that they do not slip on the strip, while the contact rollers are driven at a peripheral speed greater than that of the forming rollers. The soldered tubular strip is then cooled in the cooling station.

Such a setup can produce substantially more tubing than the prior-art systems. Using the last forming rollers, the ones that press the workpiece against the head of the mandrel, as the upstream electrical contact considerably simplifies the installation. These rollers can engage with considerable force, as they are merely pressing the sheet metal against the mandrel, so very good electrical contact is made, in fact with the entire surface region of a portion of the workpiece. This is important since the tubing is, prior to being soldered together, quite unstable so any radial contact with it can deform it disadvantageously.

The slightly higher speed of the downstream contact rollers allows the system to compensate for the inevitable increase in length from thermal expansion in the soldering station. The increased speed takes up the slack thus produced and prevents the heated tube from drooping and losing shape. Any such looseness can lead to vibrations that would affect the quality of the tubing. In fact the speed of the downstream pair of contact rollers is set in accordance with that of the upstream contact rollers, as a fixed amount greater depending on the workpiece type. This speed can be set once and for all for the workpiece in question. If the workpiece is not kept longitudinally taut it will sag and vibrate, ruining the finished product. Such vibration is a particular problem when the rollers slip on the workpiece, for which reason the instant invention aims at eliminating all slip between the rollers and the tubular workpiece.

According to another feature of the invention the tubular strip is engaged in the soldering zone between the forming and contact rollers with an intermediate pair of rollers that are rotated at a speed faster than that of the forming rollers and slower than that of the contact rollers. The electrical current is passed through the strip by connecting one side of a direct-current source to the intermediate rollers and the other side of the direct-current source to the forming and contact rollers. Furthermore the rollers engage the strip substantially without slip, in order to prevent any damage to the workpiece and the generation of any vibration. The voltage and/or amperage of the electric current are themselves varied, again this being done just once during setup. Being able to adjust the electric power largely replaces the necessity of adjusting the positions of the contact rollers.

The apparatus according to the invention has a supply for advancing a flat metal strip in a travel direction along a path through a forming station and then through a soldering station and then through a cooling station, a mandrel in the forming station, at least one pair of forming rollers engaging the strip at the mandrel for forming the strip in the forming station into a multilayer tubular shape by pressing it against the mandrel, and a pair of contact rollers engaging the strip downstream of the forming station. A power supply applies electrical current to the forming and contact rollers to flow via the forming and contact rollers through the tubular strip between the forming and contact rollers to heat the strip in the soldering station and thereby fuse layers of the tubular strip together. Separate drives rotate the forming rollers at a peripheral speed identical to a travel speed of the strip so that the forming rollers do not slip on the strip while rotating the contact rollers at a peripheral speed greater than that of the forming rollers. In any case there is no slip between the rollers and the workpiece.

According to the invention a pair of intermediate rollers between the soldering and forming rollers engage the tubular strip and another separate or individual drive rotates the intermediate rollers. The drive of the intermediate rollers rotates the intermediate rollers at a peripheral speed faster than that of the forming rollers and slower than that of the contact rollers. The rollers are substantially nondisplaceable in the travel direction and each pair of rollers includes an upper roller and a lower roller and the drive include means, e.g. a toothed-belt drive, for rotating each upper roller at the same speed as the respective lower roller. The drive operates the respective pair of rollers at speeds that are fixed relative to each other.

The source according to this invention includes a polyphase transformer having a primary winding connected to line and a secondary winding and rectifiers between the secondary winding and the sides of the power supply. In addition parallel oppositely connected thyristors are provided between the primary winding and line. The line is three-phase and the transformer is a delta-type three-phase transformer.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
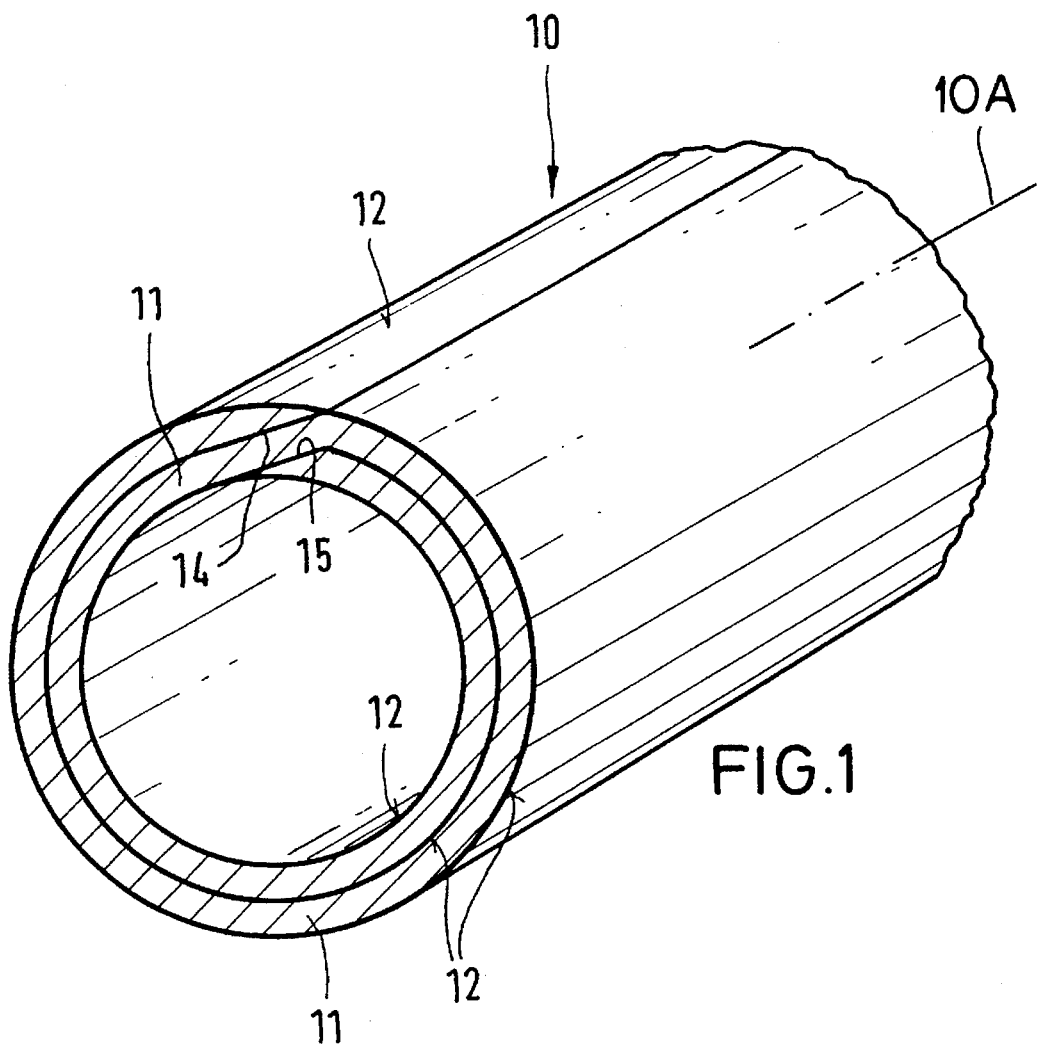
FIG. 1 is a perspective view partly in cross section through a tube according to the invention.

As seen in FIG. 1 a tube 10 according to this invention is formed of a single flat steel strip 11 both whose faces are coated with a thin layer 12 of copper and wound up in two layers so as to form the cylindrical tube 10 centered on an axis 10A. The edges of the strip 11 used to make the tube 10 are beveled or coined at 14 and 15 so that the finished product is of uniform wall thickness.

Figure 2:
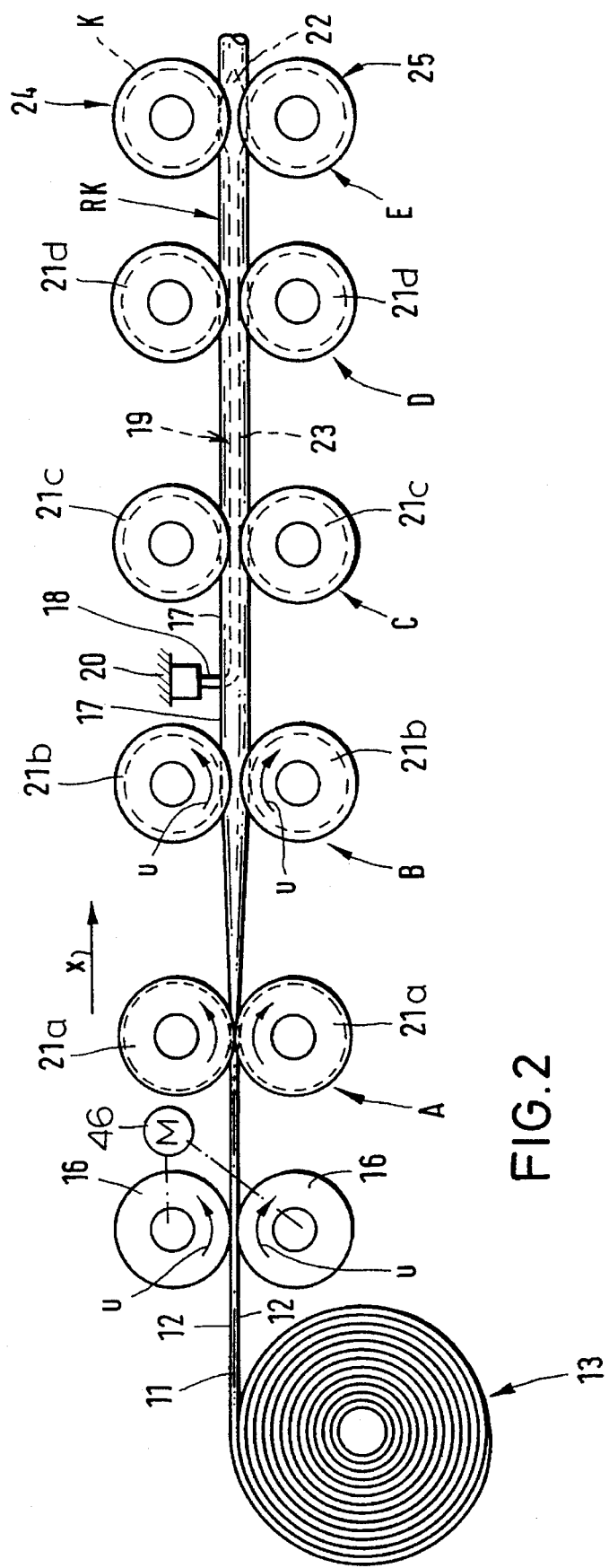
FIGS. 2 and 3 are partly diagrammatic side views, respectively of the upstream and downstream portions of the apparatus according to the invention.

As seen in FIG. 2 the strip 11 is pulled from a coil 13 by a pair of supply rollers 16 driven in direction u by a drive motor 46 operated by controller 43 to move in a travel direction x at a constant speed and is passed through five sequential forming stations A, B, C, D, E, and F all also driven by respective motors like the motor 46 in directions u. The stations A and B have rollers 21a and 21b that form the strip 11 into a U-shape with an upwardly open slot 17. A mandrel assembly 19 has a mounting rod 23 extending axially downstream in the U-section strip 11 from a rear end 18 extending radially out to where it is secured at a fixed location 20 between the stations B and C. The downstream end of this rod 23 carries a circular-section head 22 of lozenge shape with rounded upstream and downstream ends. Rollers 21c and 21d respectively in the stations C and D close the slot 17 and rollers 24 and 25 with semicircular grooves K at the station E press the strip 11 into a circular-section shape tightly around the mandrel head 22 which is located just between these rollers 24 and 25. At this point therefore the workpiece has the tubular shape of FIG. 1 but the copper layers 12 have not been fused to solder it together. The rollers 24 and 25 are driven by the same drive 46 that rotates the rollers 16 and 21a through 21d.

Figure 3:
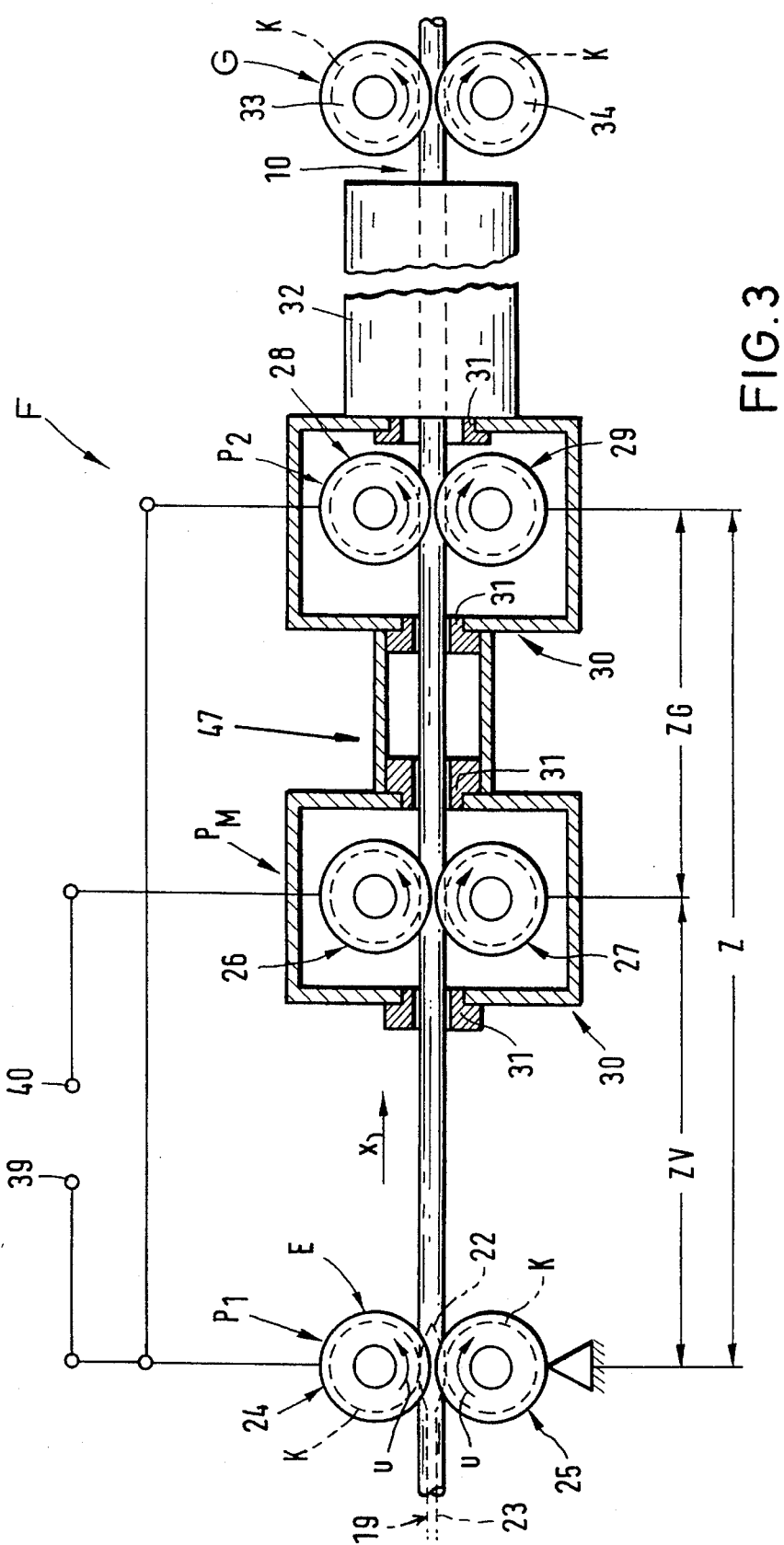

Then as shown in FIG. 3 the tube passes through a soldering station F where the copper layers 12 are fused and through a cooling station G where the fused copper is again solidified to form the double-layer finished tube 10. The soldering station F is formed by the downstream forming rollers 24 and 25 of the station E, central contact rollers 26 and 27, and downstream contact rollers 28 and 29, all of which are identical steel rollers each formed with a semicircular groove to maintain the rolled tube in the desired shape and provide good roller/workpiece contact. The center rollers 26 and 27 form a center electrode or pole $P_M$ connected to a power-supply output terminal 40, and the upstream and downstream rollers 24, 25; 28, 29 are both grounded at 41 (FIG. 4) and connected to the other output terminal 39 as end poles $P_1$ and $P_2$ so that they also form contact electrodes by means of which the current is transmitted to the workpiece 10. Thus the stations E and F form a soldering zone Z subdivided by the central rollers 26 and 27 into an upstream preheating zone ZV and a downstream fusing zone ZG. The roller pair 26, 27 and the roller pair 28, 29 are enclosed in a dumbbell-shaped chamber 30 having a restricted-size central part 47 and filled with a nonoxidizing gas, here hydrogen and/or nitrogen. Bushings 31 prevent substantial leakage of the gas.

The cooling station G has a chamber 32 filled with cold water and a pair of rollers 33 and 34 that pull the finished tube 10 and that are identical to the rollers 24–29. The rollers 26, 27, 28, 29, 33, and 34 are all driven by respective servomotors 45 and the speed of these rollers and of the rollers 24 and 25 is monitored by tachometers 42 all connected via a line 44 to the controller 43. The controller 43 operates the motors 45 so that the respective roller pairs 26, 27; 28, 29; and 33, 34 rotate synchronously, that is at the same speed, as the rollers 24 and 25 so there is no slip, in particular with the contact rollers 24, 25, 26, 27, 28, and 29. In fact a single motor 45 can be provided for the rollers 26, 27, 28, 29, 33, and 34 and they can be interconnected by a nonvariable-ratio transmission, for instance a toothed-belt drive to ensure prefect synchronization. Nonetheless there is an incremental increase in peripheral speed of the roller pairs 24, 25; 26, 27; 28, 29; and 33, 34 to compensate for thermal expansion of the workpiece so that the workpiece remains taut.

Figure 4:
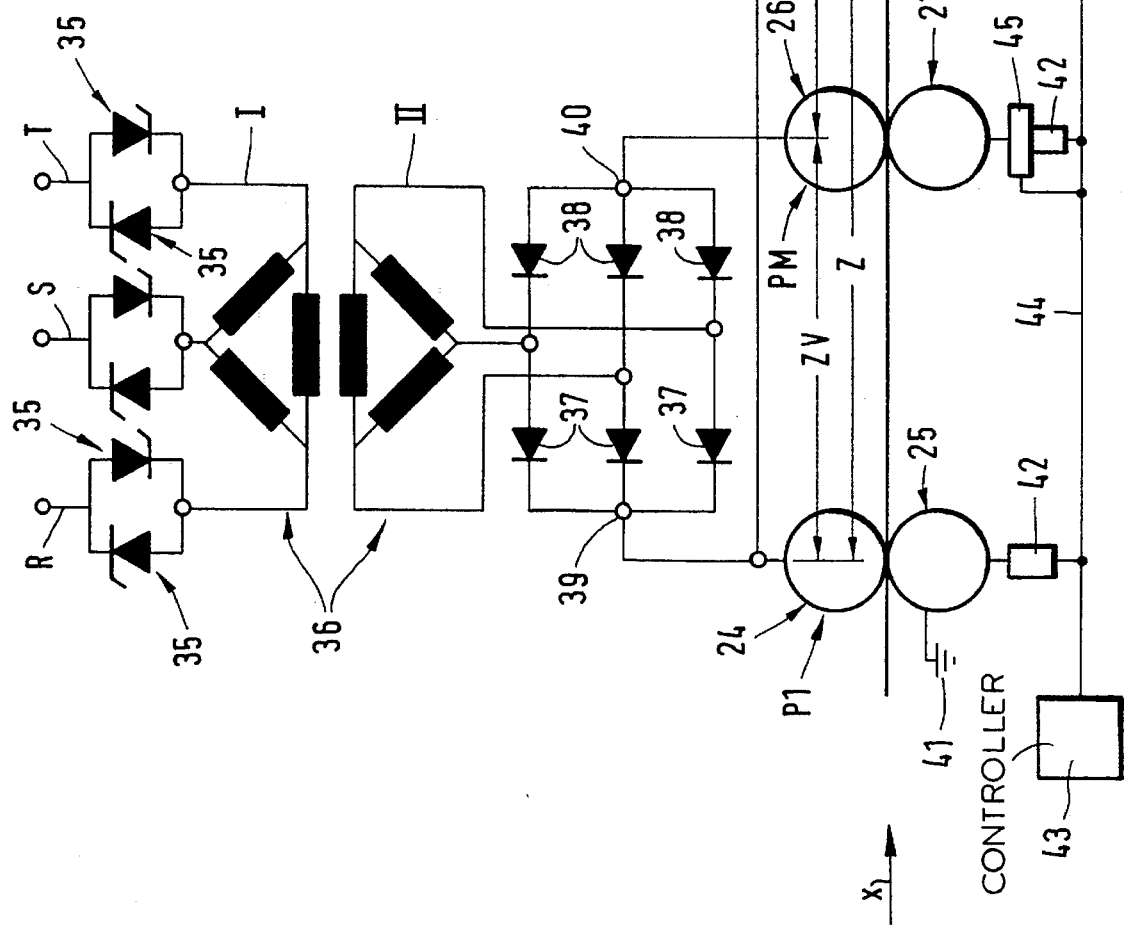
FIG. 4 is a schematic diagram illustrating the system of this invention.

FIG. 4 shows how a 380 volt source having three phases R, S, and T is connected via thyristors 35 to the input winding I of a three-phase transformer 36 whose output winding is connected via respective diodes 37 and 38 arranged for rectification to the terminals 39 and 40. Thus the terminals 39 and 40 receive pulsating direct-current voltage of at most 50 volt, the output voltage being determined by the clipping effected by the diodes 35. The voltage at the terminals 39 and 40 is determined by the setting of the thyristors 35.

Thus the strip 11 is shaped by the forming stations into a tube. Electricity applied to it in the region Z heats it to about 1050° C. to melt the copper. The melted copper resolidifies in the cooling station G, leaving the layers of the tube fused together. The amount of heating in the zone Z is mainly a function of the voltage passing through it, which voltage is varied by means of the thyristors 35 which can clip the alternating current fed to the primary I of the transformer 36. The rollers 26 and 27 are rotated by the respective drive motor 45 at a speed that is slightly faster than that of the rollers 24 and 25 as determined by the upstream tachometer 42, and the rollers 28 and 29 are rotated even more rapidly to compensate for longitudinal length increase from heat. The rollers 24 and 25 which press the workpiece against the mandrel head 22 and which do not slip transmit the electricity with virtually no losses to the workpiece, while the downstream rollers which also do not slip can also be counted on to make excellent electricity-conducting contact.

We claim:

1. A method of making tubing comprising the steps of:
   advancing a flat metal strip in a travel direction along a path through a forming station and then through a soldering station and then through a cooling station;
   forming the strip in the forming station into a multilayer tubular shape by pressing it at the forming station against a mandrel with a pair of forming rollers;
   engaging the strip downstream of the forming station in the soldering station by a pair of contact rollers;
   applying electrical current directly to the forming and contact rollers and therethrough to the strip and flowing the electrical current via the forming and contact rollers through the tubular strip between the forming and contact rollers to heat the strip in the soldering station and thereby fuse layers of the tubular strip together;
   driving the forming rollers to rotate at a peripheral speed identical to a travel speed of the strip so that the forming rollers do not slip on the strip;
   driving the contact rollers to rotate at a peripheral speed greater than that of the forming rollers and thereby maintain the strip under longitudinal tension between the forming rollers and the contact rollers with substantially no slippage between the contact rollers and the strip; and
   cooling the soldered tubular strip in the cooling station.

2. The method defined in claim 1, further comprising the steps of:
   engaging the tubular strip in the soldering zone between the forming and contact rollers with an intermediate pair of rollers; and
   driving the intermediate rollers to rotate at a speed faster than that of the forming rollers and slower than that of the contact rollers.

3. The method defined in claim 2 wherein electrical current is passed through the strip by connecting one side of a direct-current source to the intermediate rollers and the other side of the direct-current source to the forming and contact rollers.

4. The method defined in claim 1, further comprising the step of
   varying the voltage of the electric current.

5. The method defined in claim 1, further comprising the step of
   varying the amperage of the electric current.

6. An apparatus for making multilayer tubing, the apparatus comprising:
   supply means for advancing a flat metal strip in a travel direction along a path through a forming station and then through a soldering station and then through a cooling station;
   a mandrel in the forming station;
   means including at least one pair of forming rollers engaging the strip at the mandrel for forming the strip in the forming station into a multilayer tubular shape by pressing it against the mandrel;
   drive means for rotating the forming rollers at a peripheral speed identical to a travel speed of the strip so that the forming rollers do net slip on the strip;
   means including a pair of contact rollers engaging the strip downstream of the forming station;
   means including a power supply for applying electrical current directly to the forming and contact rollers and therethrough to the strip and flowing the electrical current via the forming and contact rollers through the tubular strip between the forming and contact rollers to heat the strip in the soldering station and thereby fuse layers of the tubular strip together;
   drive means for rotating the contact rollers at a peripheral speed greater than that of the forming rollers for maintaining the strip under tension between the contact rollers and the forming rollers without substantial slippage of the contact rollers on the strip; and
   means for cooling the soldered tubular strip in the cooling station.

7. The tubing-making apparatus defined in claim 6 wherein the power source is a direct-current source having one side connected to the forming rollers and another side connected to the contact rollers.

8. The tubing-making apparatus defined in claim 6 wherein the rollers are substantially nondisplaceable in the travel direction.

9. The tubing-making apparatus defined in claim 6 wherein each pair of rollers includes an upper roller and a lower roller and the drive means include means for rotating each upper roller at the same speed as the respective lower roller.

10. The tubing-making apparatus defined in claim 6 wherein the drive means operate the respective pair of rollers at speeds that are fixed relative to each other.

11. The tubing-making apparatus defined in claim 6 wherein the source is of variable voltage and current.

12. The tubing-making apparatus defined in claim 11 wherein the source includes
   a polyphase transformer having a primary winding connected to line and a secondary winding;
   means including rectifiers between the secondary winding and the sides of the power supply for supplying direct current of one polarity to the forming rollers and of the opposite polarity to the contact rollers.

13. The tubing-making apparatus defined in claim 12 wherein the source further includes
   parallel oppositely connected thyristors between the primary winding and line.

14. The tubing-making apparatus defined in claim 12 wherein the line is three-phase and the transformer is a delta-type three-phase transformer.

15. The tubing-making apparatus defined in claim 6, further comprising:
   a pair of intermediate rollers between the soldering and forming rollers engaging the tubular strip; and
   drive means for rotating the intermediate rollers at a peripheral speed faster than that of the forming rollers and slower than that of the contact rollers.

16. The tubing-making apparatus defined in claim 6, further comprising:
   a pair of rollers in the cooling station gripping the tube; and
   drive means for rotating the cooling-station rollers at a rate that is directly related to the peripheral speed of the contact rollers.

* * * * *